United States Patent
Nekado et al.

(10) Patent No.: US 6,772,088 B2
(45) Date of Patent: Aug. 3, 2004

(54) POSITION TRANSDUCER

(75) Inventors: Yasuo Nekado, Kanagawa (JP); Michio Okano, Kanagawa (JP); Shigeru Ishimoto, Kanagawa (JP); Mitsuru Ohno, Kanagawa (JP); Masaaki Kusumi, Kanagawa (JP)

(73) Assignee: Sony Precision Technology Inc., Tokyo (JP)

(*) Notice: Subject to any disclaimer, the term of this patent is extended or adjusted under 35 U.S.C. 154(b) by 0 days.

(21) Appl. No.: 10/371,875

(22) Filed: Feb. 21, 2003

(65) Prior Publication Data

US 2003/0187608 A1 Oct. 2, 2003

(30) Foreign Application Priority Data

Mar. 8, 2002 (JP) .................................. P2002-064566

(51) Int. Cl.$^7$ .............................................. G06F 15/00
(52) U.S. Cl. ...................... 702/158; 702/104; 702/150; 702/151
(58) Field of Search .......................... 702/94, 95, 104, 702/116, 150, 151, 158; 360/75, 77.08, 78.12, 78.14

(56) References Cited

U.S. PATENT DOCUMENTS

2003/0187609 A1 * 10/2003 Kusumi et al. ............. 702/150

FOREIGN PATENT DOCUMENTS

| JP | 50-99564 | 8/1975 | ............ G08C/9/00 |
| JP | 63-177019 | 7/1988 | .......... G01D/5/249 |
| JP | 1-152314 | 6/1989 | .......... G01D/5/249 |
| JP | 2-21216 | 1/1990 | .......... G01D/5/249 |
| JP | 2-284025 | 11/1990 | .......... G01D/5/249 |
| JP | 2571393 | 10/1996 | .......... G01D/5/249 |
| JP | 2571394 | 10/1996 | .......... G01D/5/249 |
| JP | 2679207 | 8/1997 | .......... G01D/5/249 |
| JP | 9-264760 | 10/1997 | .......... G01D/5/249 |
| JP | 9-264761 | * 10/1997 | .......... G01D/5/249 |
| JP | 3063044 | 5/2000 | .......... G01D/5/249 |
| JP | 3103266 | 8/2000 | .......... G01D/5/249 |

* cited by examiner

*Primary Examiner*—Bryan Bui
(74) *Attorney, Agent, or Firm*—Haverstock & Owens LLP

(57) ABSTRACT

A position transducer capable of accurately detecting an n-bit code by a small number of ABS detectors when there is provided one ABS track. In an ABS head, the ABS detectors $10_1$ to $10_{n+m}$ are disposed for a distance $\lambda_1$ between the first ABS detector $10_1$ and (n+m)th ABS detector $10_{n+m}$ to satisfy a requirement $(n-1)\lambda+2\delta<\lambda_1$ and a distance $\lambda_2$ between two successive ones of the ABS detectors to satisfy a requirement $2\delta<\lambda_2<\lambda-2\delta$, so that at least one ABS detector is opposite to a stable area T in each of micro-areas at n successive bits.

4 Claims, 13 Drawing Sheets

POSITION TRANSDUCER

BACKGROUND OF THE INVENTION

1. Field of the Invention

The present invention relates to a position transducer used in the fields of machine tools, industrial machinery, etc. to detect a position changed due to a rectilinear movement, rotational movement or the like.

This application claims the priority of the Japanese Patent Application No. 2002-064566 filed on Mar. 8, 2002, the entirety of which is incorporated by reference herein.

2. Description of the Related Art

The position transducers used in th fields of machine tools, industrial machinery, etc. to detect a position changed due to a rectilinear movement or the like are known from the disclosure in the Japanese Unexamined Application Publication Nos. 99564 of 1985, 177019 of 1988, 152314 of 1989, etc.

Referring now to FIG. 1, there is schematically illustrated in the form of a block diagram a conventional position transducer with one absolute track. The position transducer is generally indicated with a reference 120. As shown, the position transducer 120 is composed of one absolute track 121 and an ABS head 124 including n absolute track detectors $123_1, 123_2, \ldots, 123_a$. It should be noted that in the following explanation, the absolute track will be referred to as "ABS track" and the ABS track detector be referred to as "ABS detector".

The ABS track 121 is formed from a pattern in which micro-areas each represented by "0" and ones each represented by "1" are laid in array according to an a-order cyclic code. The micro-area represented by "0" and one represented by "1" are different in physical property from each other. For example, for the position transducer 120 to magnetically detect the position of the ABS head 124, the micro-areas "1" are magnetized but the micro-areas "0" are not.

The ABS head 124 is movable longitudinally of the ABS track 121 as indicated by an arrow Y in FIG. 1. Each of the ABS detectors $123_1$ to $123_a$ is provided in a position opposite to the ABS track 121. Also, when the micro-areas are laid at a pitch λ, the ABS detectors $123_1$ to $123_a$ are spaced a distance λ corresponding to the micro-area pitch λ from each other.

In the aforementioned position transducer 120, since the ABS track 121 is formed as the pattern in which the micro-areas each represented by "0" and ones each represented by "1" are laid in array according to the a-order cyclic code, as the ABS head 124 moves in relation to the ABS track 121, the ABS head 124 will detect ABS values all different from each other irrespectively of the fact that only the ABS track 121 is included in the position transducer 120. Therefore, the position transducer 120 can detect the position of the ABS head 124 in relation to the ABS track 121 on the basis of the ABS values detected by the ABS head 124.

The position transducer 120 can have the ABS track 121 reduced in size in a direction indicated by an arrow Z in FIG. 1 because it has only one ABS track 121. That is, the position transducer 120 can be designed smaller.

In the position transducer 120 having only the ABS track 121, when the position of the ABS head 124 varies, signals outputs from two or more of the ABS detectors $123_1$ to $123_n$ will possibly be switched from one to another. Specifically, signal outputs from two or more of the ABS detectors $123_1$ to $123_n$ are switched from "0" to "1" or vice versa.

It is difficult to provide all the ABS detectors $123_1$ to $123_n$ having quite the same capability of detecting a physical property and outputting a signal. Also it is difficult to provide all the micro-areas spaced at quite the same pitch λ (as shown in FIG. 1) from each other when producing the ABS track 121.

Therefore, when each of the ABS detectors $123_1$ to $123_n$ is opposite to near the edge of a micro-area, it is difficult for the ABS head 124 to accurately detect a code from the ABS track 121 because the ABS detectors $123_1$ to $123_n$ output signals at different times, respectively.

Also, when each of the ABS detectors $123_1$ to $123_a$ is opposite to near the edge of a micro-area, the magnetic field to be detected is influenced by the adjacent micro-areas. Therefore, when a magnetized micro-area is adjacent to a micro-area not magnetized, there will take place near the edge of each micro-area an area where it is difficult for the ABS detector to stably output "1" or "0" signal.

Namely, when each of the ABS detectors $123_1$ to $123_a$ is near the edge of a micro-area, it will be difficult for the position transducer 120 to accurately detect the position of the ABS head 124 in relation to the ABS track 121.

Position transducers capable of detecting the position of the ABS head in relation to the ABS track without error include two types which will be described below.

The first one of the two types of position transducers is disclosed in the Japanese Unexampled Application Publication No. 1990-21216, Japanese Patent No. 2679207 and Japanese Unexamined Application Publication No. 1988-152314, respectively. This position transducer does not detect signal output from each of the ABS detectors that is opposite to near the edge of a micro-area but detects signal output from each of the ABS detectors that is opposite to near the center of the micro-area (which area will be referred to as "stable area" hereunder).

FIG. 2 is also a block diagram of a variant of the aforementioned conventional position transducer. This conventional position transducer is generally indicated with a reference 140. As shown, in the position transducer 140, an incremental track 142 having a pattern of constant-wavelength, alternating magnetic fields is juxtaposed with the ABS track 121. Also, the position transducer 140 includes, in addition to the ABS head 124, an incremental track head 144 having two incremental track detectors $143_1$ and $143_2$.

The position transducer 140 is adapted such that judging from a signal output from the incremental track head 144 that each of the ABS detectors $123_1$ to $123_a$ is in the stable area, it detects signal outputs from the ABS detectors $123_1$ to $123_a$.

When each of the ABS detectors $123_1$ to $123_a$ is not in the stable area, however, the aforementioned position transducer 140 cannot detect any position of the ABS head 124 in relation to the ABS track 121.

Therefore, for example, to detect the position of the ABS head 124 in relation to the ABS track 121 the moment the power is applied to the position transducer 140, each of the ABS detectors $123_1$ to $123_a$ have to be in the stable area at that moment. If none of the ABS detectors $123_1$ to $123_a$ are in their respective stable areas, the position transducer 140 cannot detect any position of the ABS head 124 in relation to the ABS track 121 before the ABS head 124 is moved until each of the ABS detectors $123_1$ to $123_a$ moves into the stable area. Namely, the position transducer 140 can hardly detect the position of the ABS bead 124 in relation to the ABS track 121 the movement it is applied with the power.

The second type of position transducer is disclosed in the Japanese Patent Nos. 2571393, 2571394, 3063044 and 3103266. The positional transducer includes a sets of ABS detectors, each set including two ABS detectors. In this position transducer, signal output from one of the two ABS detectors that is opposite to the stable area is used to detect an a-bit code.

In this position transducer, however, the ABS head includes 2n ABS detectors to detect an n-bit code indicating an a-bit code. That is, the position transducer will have a larger number of ABS detectors for the number of bits in a code the ABS head detects. Since many ABS detections are made in the position transducer, the ABS head will possibly have to be designed large and corresponding addition of wires and the like will possibly cause the circuit to be more complicated. Therefore, this position transducer can hardly be designed compact. Also, since the position transducer is produced through many steps, it is difficult to produce it with less costs.

Further, the Japanese Unexamined Application Publication No. 1990-284025 discloses a positional transducer which detects an a-bit code by an ABS head composed of (a+α) (α is an integer larger than 1) ABS detectors nearly equidistantly spaced from each other.

In the above position transducer, the ABS detectors are so disposed that when the ABS head is moved in relation o the ABS track, one ABS detector at the maximum will be opposite to near the boundary between a micro-area and a one adjacent to the micro-area, and the value α is decided so that one code will take place in the effective length of measurement taking in account a case in which a code is detected by the ABS head including also an ABS detector whose output is unstable.

In this position transducer, however, the value α has to be 7 when the value a=8 for example as described in the above Japanese Unexamined Application Publication No. 1990-284025. Namely, the number of ABS detectors provided in the position transducer is 2a−1. Therefore, for this position transducer, it is difficult to design the ABS head compact and simplify the circuit.

Also, in the above position transducer, if α<7 when a=8, one code will take place twice in the effective length of measurement. Therefore, when α<7, only a part of the ABS track in the position transducer will be usable. Namely, since the effective length of measurement is reduced, the detectable range will be narrower.

OBJECT AND SUMMARY OF THE INVENTION

It is therefore an object of the present invention to overcome the above-mentioned drawbacks of the related art by providing a position transducer capable of accurately detecting an n-bit code by an absolute track head including n+m (n is a larger integer than 3 and m is a larger integer than 1) absolute track detectors even when it includes one absolute track and also capable of detecting the position of the absolute track head in relation to the absolute track independently of the position of each absolute track detector.

The above object can be attained by providing a position transducer including according to the present invention:

an absolute track in which micro-areas each represented by "0" and those each represented by "1", when two types of micro-areas different in signal-selective physical property from each other are represented by either of two codes "0" and "1", are laid in array to provide an n-bit code (n is a larger integer than 3);

an absolute track head having (n+m) (m is a larger integer than 1) absolute track detectors laid in array oppositely to the absolute track and which is movable in relation to the absolute track to detect the physical property of the absolute track;

an intra-micro-area position detecting means for detecting the position of each absolute track detector in the micro-area;

a signal selecting means for selecting n ones of (n+m) signal outputs from the absolute track detectors on the basis of the result of detection by the intra-micro-area position detecting means; and a code deciding means for the n-bit code on the basis of signal output from an absolute track detector selected by the signal selecting means;

a distance $\lambda_1$ between the first one and (n+m)th one of the absolute track detectors satisfying a requirement that $(n-1)\lambda+2\delta<\lambda_1$ (where $\lambda>0$ and $\delta>0$, $\lambda$ is the minimum resolution length of signal output from each absolute track detector and $\delta$ in an unstable area is a length in the moving direction of the absolute track head); and a distance $\lambda_2$ between the absolute track detectors satisfying a requirement that $2\delta<\lambda_2<\lambda-2\delta$.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The position transducer according to the present invention will be described concerning a linear encoder as an embodiment thereof with reference to FIGS. 3 to 18.

Figure 1:
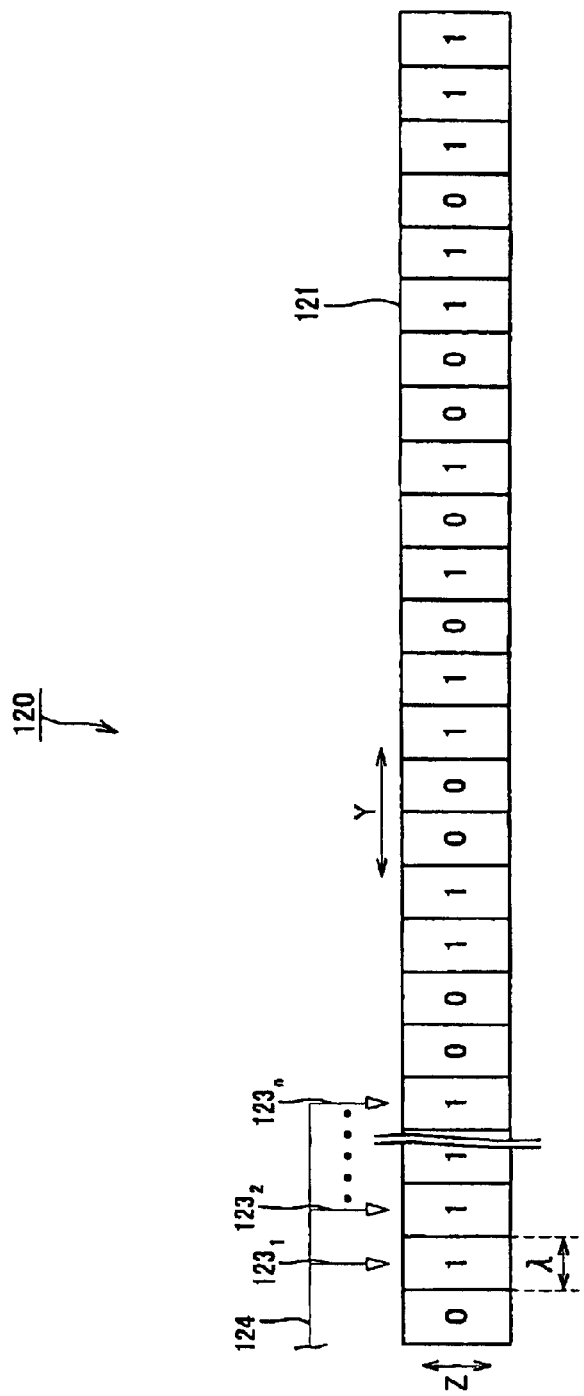
FIG. 1 is a block diagram of a conventional position transducer with one absolute track.
Figure 2:
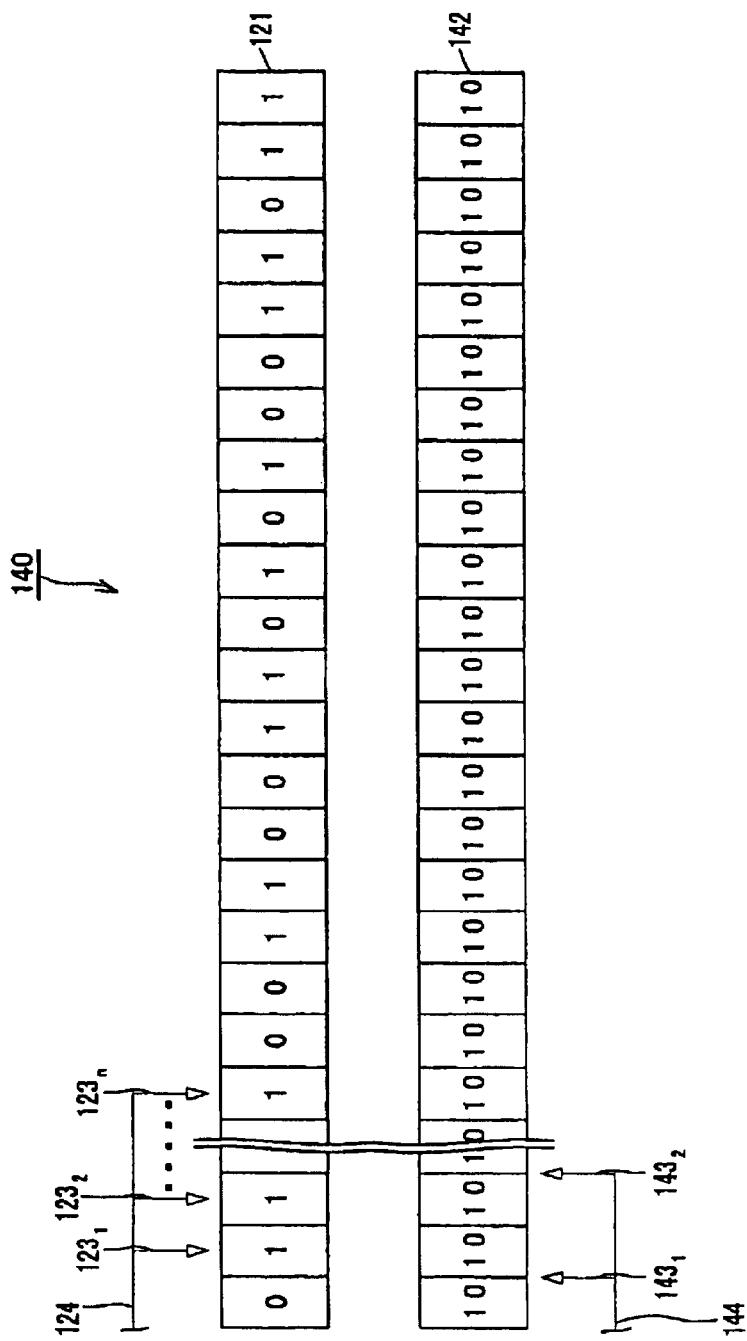
FIG. 2 is also a block diagram of a variant of the conventional position transducer in FIG. 1, which has one absolute track and also an incremental track juxtaposed with the absolute track.
Figure 3:
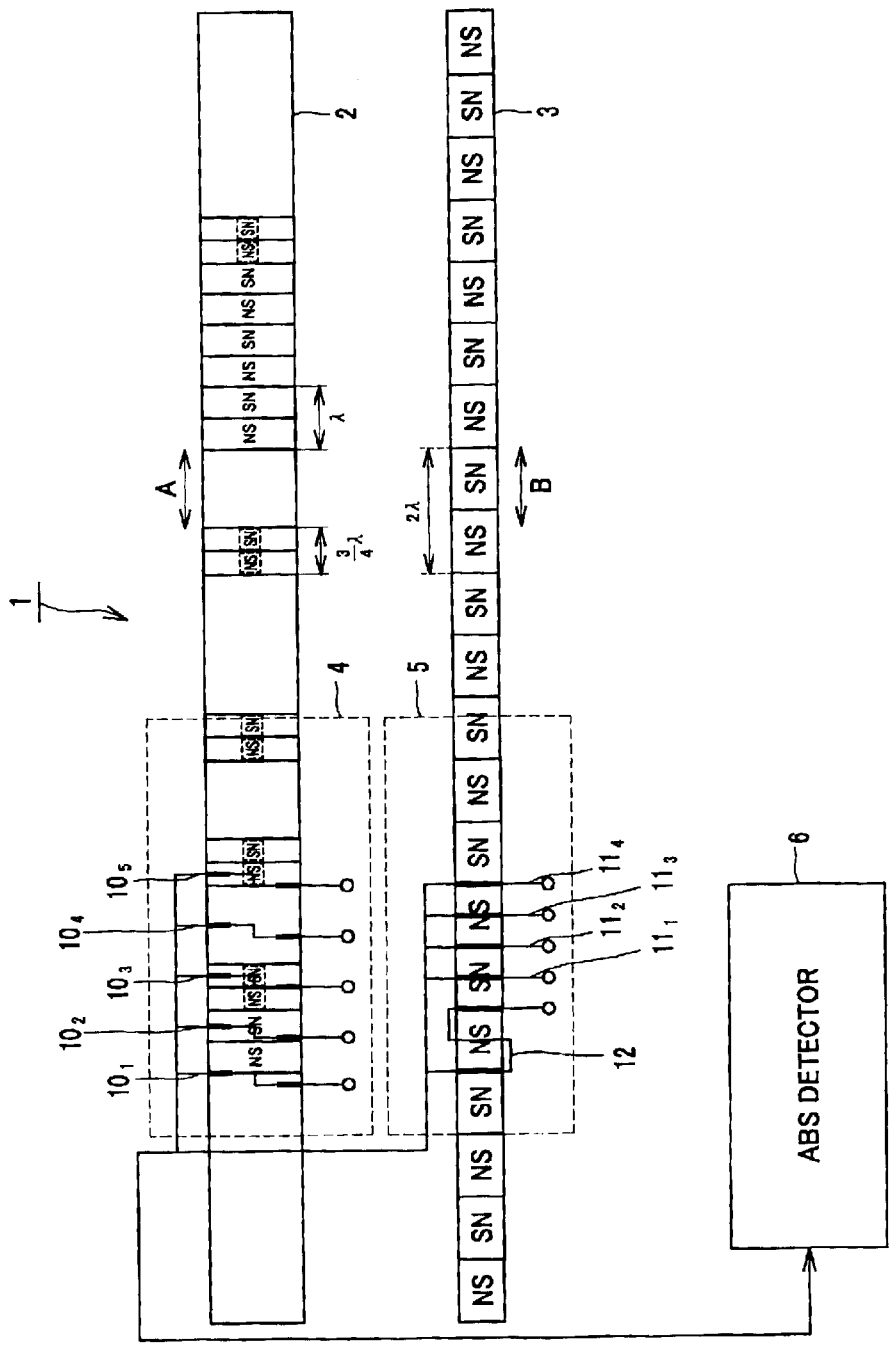
FIG. 3 schematically illustrates a linear encoder according to the present invention.

The linear encoder is generally indicated with a reference 1. As shown in FIG. 3, the linear encoder 1 includes an absolute track (will be referred to as "ABS track" hereunder) 2, incremental track (will be referred to as "INC track" hereunder) 3, absolute track head (will be referred to as "ABS head" hereunder) 4, incremental track head (will be referred to as "INC head" hereunder) 5 and an absolute position detector 6.

The ABS track 2 is a magnetic pattern in which micro-areas each represented by "0" and those each represented by "1" are laid in array according to an n-order cyclic code ($n$ is an integer larger than 3). One micro-area indicates one bit of the code. In this embodiment, the cyclic code is a a maximum periodic series generated by a quartic primitive polynominal. That is, the ABS track 2 has such a magnetic field pattern that when a 4-bit code is sequentially read from the ABS track 2 while being moved bit by bit, the same 4-bit code will not take place again within an effective length of measurement.

In the ABS track 2, the micro-area represented by "0" is not magnetized while the micro-area represented by "1" is magnetized. In this embodiment, the micro-area represented by "1" is so magnetized as to have the magnetic pole changed from N to S and from S to N in the direction from one edge of a micro-area near an adjacent micro-area toward another edge of the micro-area near another adjacent micro-area as shown in FIG. 3.

Figure 4:
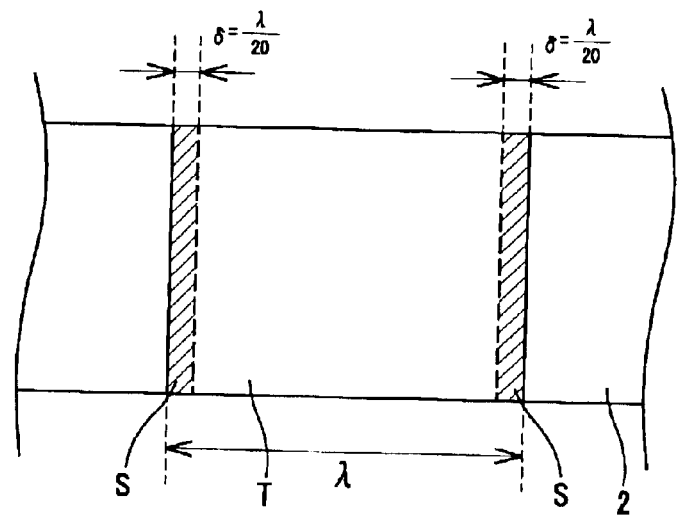
FIG. 4 schematically illustrates unstable and stable areas.

Also, near the edge of an adjacent micro-area, there will be an area S which will be influenced by the adjacent micro-area as shown in FIG. 4. In the following explanation, the area S influenced by the adjacent area will be referred to as "unstable area S" and an area T not influenced by adjacent area will be referred to as "stable area T". The length of an unstable area S, extending longitudinally of the ABS track 2 and indicated with an arrow A in FIG. 3, is assumed to be $\delta$. It should be noted that in this embodiment, $\delta=\lambda/20$.

Note that the ABS track 2 in this embodiment is produced by the method disclosed in the Japanese Unexamined Application Patent No. 1997-264760 previously filed by the Applicant. That is, in the ABS track 2, when magnetized micro-areas S exist successively, the pitch of them except for one is $\lambda$ and the pitch of the one magnetized micro-area is $3/4\lambda$. Also, in the ABS track 2, when the magnetized micro-areas exist discretely, the pitch of them is $3/4\lambda$.

The INC track 3 is a magnetic field pattern composed of alternating magnetic fields of $2\lambda$ in wavelength, and is juxtaposed to the ABS track 2.

The ABS head 4 detects an n-bit code from the ABS track 2. In this embodiment, the ABS head 4 detects a 4-bit code.

The ABS head 4 is provided to be movable longitudinally of the ABS track 2. The ABS head 4 includes (n+m) ($\underline{m}$ is a larger integer than 1) absolute track detectors $10_1, 10_2, \ldots, 10_{n+m-1}$ and $10_{n+m}$. It should be noted that in the following explanation, the absolute track detector will be referred to as "ABS detector". The ABS head 4 will be described in detail later.

Figure 5:
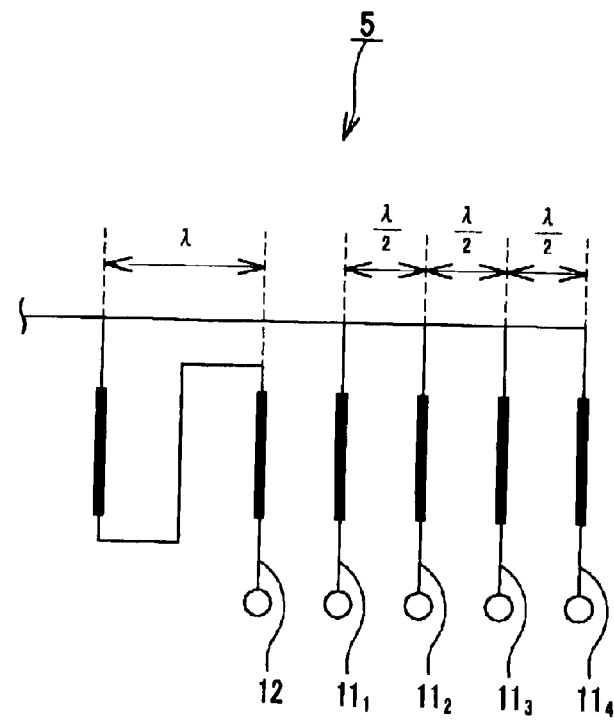
FIG. 5 schematically shows the layout of INC detectors and differential output detector in an INC head.

The INC head 5 is provided to be movable longitudinally of the INC track 3 as indicated with an arrow B in FIG. 3. Also, the INC head 5 moves along with the ABS head 4. The INC head 5 includes four incremental track detectors $11_1$, $11_2$, $11_3$ and $11_4$ and a differential output detector 12 as shown in FIG. 5. It should be noted that in the following explanation, the incremental tack had will be referred to as "INC head".

Each of the INC detectors $11_1$ to $11_4$ detects a magnetic field from the INC track 3 and outputs a detection signal. Each of the INC detectors $11_1$ to $11_4$ includes an MR element. Also, the INC detectors $11_1$ to $11_4$ are disposed in array adjacently to each other longitudinally of the INC track 3. Further, the interval between two successive ones of the INC detectors $11_1$ to $11_4$ is $\lambda/2$. In the linear encoder 1, the absolute position detector 6 computes based on a differential output between the INC detectors $11_1$ and $11_3$ and a differential output between the INC detectors $11_2$ and $11_4$ to detect from which micro-area of the ABS track 2 the ABS detector $10_1$ has detected a magnetic field.

Figure 6:
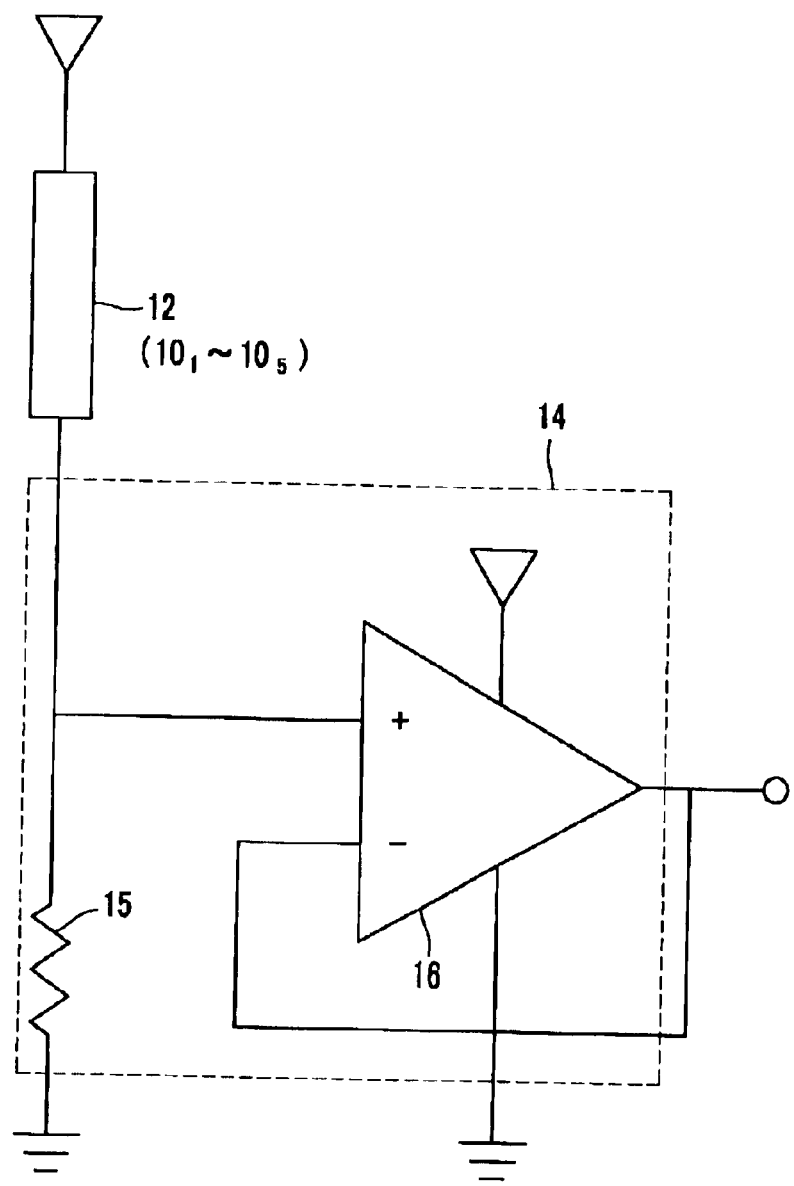
FIG. 6 is a diagram of an output detection circuit of the differential output detector.

Two of the MR elements of the INC detectors are connected in serial to the differential output detector 12, and disposed with a space $\lambda$ between them. The differential output detector 12 includes also an output detection circuit 14 as shown in FIG. 6. The output detection circuit 14 includes a resistor 15 and an operational amplifier 16. The differential output detector 12 is connected in serial to the resistor 15. The output detection circuit 14 outputs a potential at a midpoint between the differential output detector 12 and resistor 15. Differentiating the output the differential output detector 12 from the outputs from the ABS detectors $10_1$ to $10_{n+m}$, the outputs from the ABS detectors $10_1$ to $10_{n+m}$ are little influenced by any noise and vary less with a change of the ambient temperature.

Figure 7:
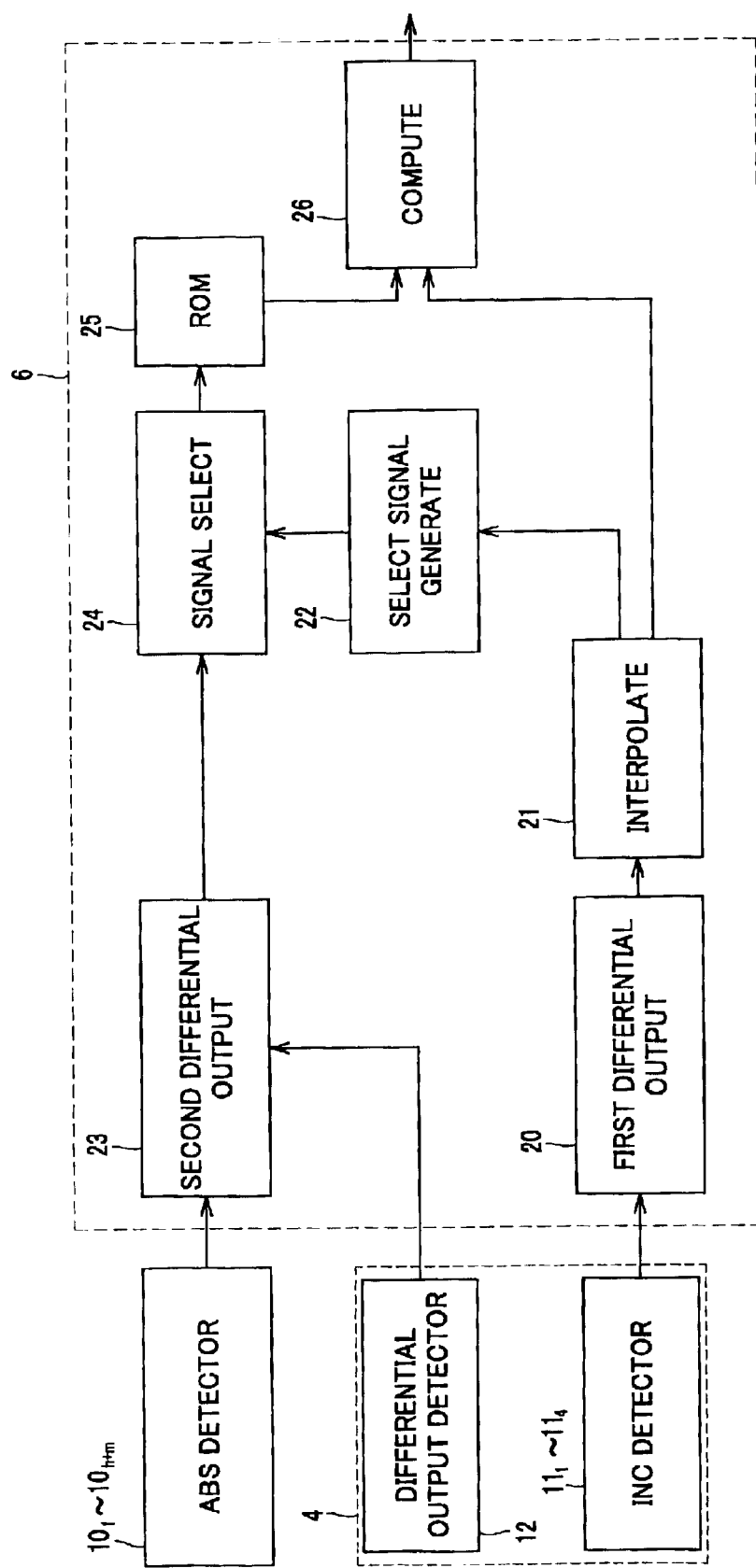
FIG. 7 is a diagram of an output detection circuit in each ABS detector.

The absolute position detector 6 acquires an absolute position signal indicative of a position of the ABS head 4 in relation to the ABS track 2 on the basis of outputs from the ABS head 4 and INC head 5. As shown in FIG. 7, the absolute position detector 6 includes a first differential output block 20, interpolation block 21, select signal generation block 22, second differential output block 23, signal selector 24, ROM 25 and a computation block 26. The absolute position detector 6 will be described in detail later.

The ABS head 4 will be described in detail herebelow:

The ABS head 4 has the (n+m) ABS detectors $10_1$ to $10_{n+m}$ laid in array longitudinally of the ABS track 2. Each of the ABS detectors $10_1$ to $10_{n+m}$ detects a magnetic field from the ABS track 2. Each of the ABS detectors $10_1$ to $10_{n+m}$ outputs a signal indicative of a logical value "1" (will be referred to as "1" signal hereunder) when it is opposite to a micro-area represented by "1", and outputs a signal indicative of a logical value "0" (will be referred to as "0" signal hereunder) when it is opposite to a micro-area represented by "0". However, when each of the ABS detectors $10_1$ to $10_{n+m}$ is opposite to an unstable area S near the boundary between a micro-area represented by "1" and a one represented by "0", it can hardly provide a stable output because an adjacent micro-area will influence the magnitude of a magnetic field to be detected, and thus can hardly output definite "1" and "0" signals. Each of the ABS detectors $10_1$ to $10_{n+m}$ detects each bit code by detecting a magnetic field from the ABS track 2.

The value m should preferably be smaller, and more preferably be 1 or 2. When the value m becomes larger, the ABS head 4 has to include a larger number of ABS detectors for the number of bits of a code to be detected. With the increased number of the ABS detectors, the circuit of the ABS head 4 will possibly be larger and more complicated. When the ABS head 4 is thus large, the linear encoder 1 can hardly be designed compact. Also, with the more complicated circuit, the linear encoder 1 can hardly be produced with less costs.

The ABS detector $10_1$ is constructed as will be described below. It should be noted that since all the ABS detectors $10_1$ to $10_{n+m}$ are constructed identically to each other, the explanation of the construction of the ABS detector $10_1$ is applied to the remaining ABS detectors $10_2$ to $10_{n+m}$.

The ABS detector $10_1$ includes two MR elements $10_{1a}$ and $10_{1b}$, connected in series to each other and spaced a distance of $\lambda/4$ from each other. The MR element $10_{1a}$ detects a magnetic field from the ABS track 2 and has the resistance thereof varies like the waveform shown in FIG. 8(A). Also, the MR element $10_{1b}$ detects a magnetic field from the ABS track and has the resistance thereof varied like the waveform shown in FIG. 8(B). The change in resistance of the ABS detector $10_1$ is an addition of the resistance change of the MR element $10_{1a}$ and that of the MR element $10_{1b}$, and the resistance varies like the waveform shown in FIG. 8(C).

Similarly to the differential output detector 12, the ABS detector $10_1$ includes an output detection circuit 14 as shown in FIG. 6. The ABS detector $10_1$ is connected in series to the resistor 15. Thus, the potential at a midpoint between the ABS detector $10_1$ and resistor 15 is outputted as signal from the ABS detector $10_1$.

Figure 9:
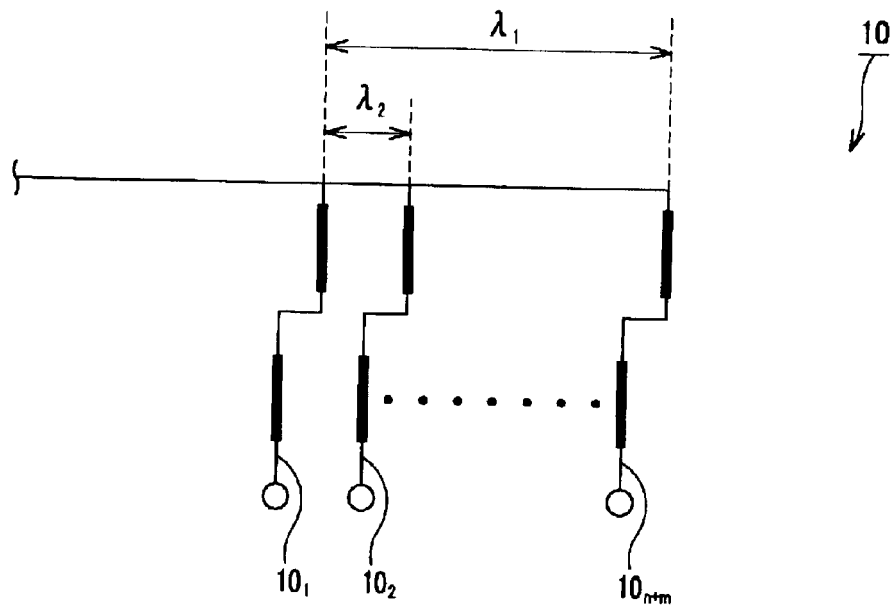
FIG. 9 schematically show the layout of (n+m) ABS detectors.

In the linear encoder 1 according to the present invention, the ABS detectors $10_1$ to $10_{n+m}$ are so disposed that a distance $\lambda_1$ between the first one and (n+m)th one of the ABS detectors satisfies a requirement given by a following expression (1) and a distance $\lambda_2$ between the ABS detectors $10_1$ to $10_{n+m}$ satisfies a requirement given by a following expression (2), as will be seen in FIG. 9.

$$(n-1)\lambda+2\delta<\lambda_1 \tag{1}$$

$$2\delta<\lambda_2<\lambda-2\delta \tag{2}$$

where $\lambda>0$ and $\delta>0$, $\lambda$ is the minimum resolution length of signal output from each absolute track detector and $\delta$ in an unstable area is a length in the moving direction of the absolute track head.

Since the ABS detectors $10_1$ to $10_{n+m}$ are positioned to satisfy the requirements given by the expressions (1) and (2), at least n ABS detectors among the (n+m) ABS detectors $10_1$ to $10_{n+m}$ will be opposite to the stable areas T of adjacent micro-areas. In the linear encoder 1, n ABS detectors opposite to n different stable areas T are selected from among the ABS detectors $10_1$ to $10_{n+m}$ and an n-bit code is judged based on signal outputs from the selected ABS detectors.

Figure 10:
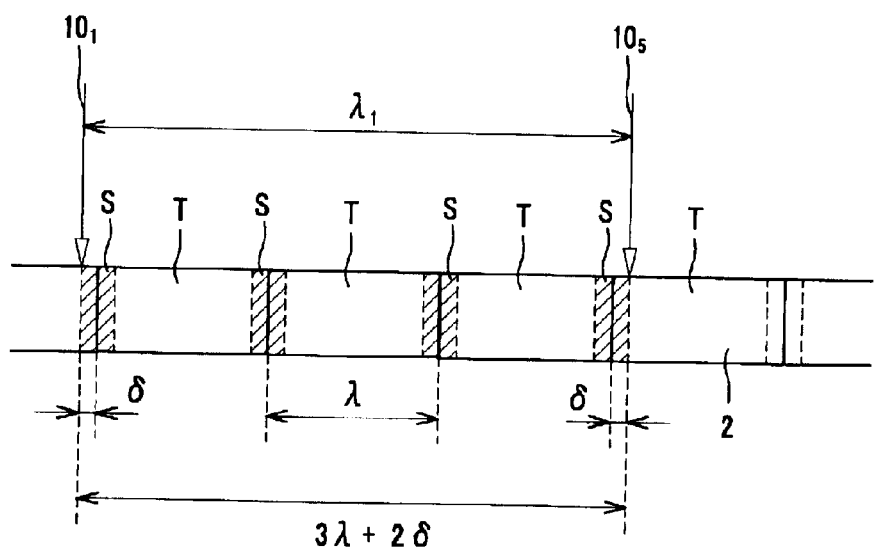
FIG. 10 shows the positional relation among the ABS detectors when the value $\lambda_1$ is smaller than $(n-1)\lambda+2\delta$.

When the value $\lambda_1$ is smaller than $\{(n-1)\lambda+2\delta\}$, the ABS detector $10_1$ will detect the b-th bit (b is a larger integer than 1), while the ABS detector $10_{n+m}$ will detect the (b+n−2)th bit. That is, the ABS head 4 can only detect a maximum of (n−1) bits and cannot detect the n-bit code. For example, when n=4 and m=1, the value $\lambda_1$ is smaller than $3\lambda+2\delta$, so that when the ABS detector $10_1$ is opposite to an unstable area S at the 0-th bit, the ABS detector $10_5$ will be opposite to an unstable area S at the third bit as shown in FIG. 10. That is, the ABS head 4 can only detect a 3-bit code but cannot detect a 4-bit code. It should be noted that the ABS detectors $10_2$, $10_3$ and $10_4$ are not illustrated in FIG. 10.

Figure 11:
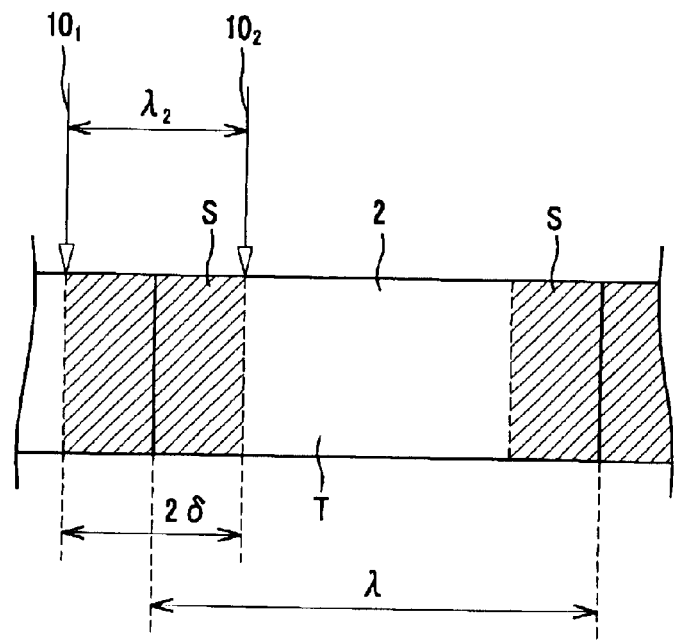
FIG. 11 shows the positional relation between two adjacent ABS detectors when the value $\lambda_2$ is smaller than $2\delta$.

Also, when the value $\lambda_2$ is smaller than $2\delta$, two or more ABS detectors will be opposite to one stable area T and at least n ones of the ABS detectors $10_1$ to $10_{n+m}$ will not be opposite to n different stable areas T, in some cases. For example, as shown in FIG. 11, if the distance between the ABS detectors $10_1$ and $10_2$ is smaller than 2 when n=4 and m=1, the ABS detectors $10_1$ and $10_2$ are opposite to the same unstable area S as the case may be, so no 4-bit code cannot be detected. It should be noted that the ABS detectors $10_3$, $10_4$ and $10_5$ are not shown in FIG. 11.

Figure 12:
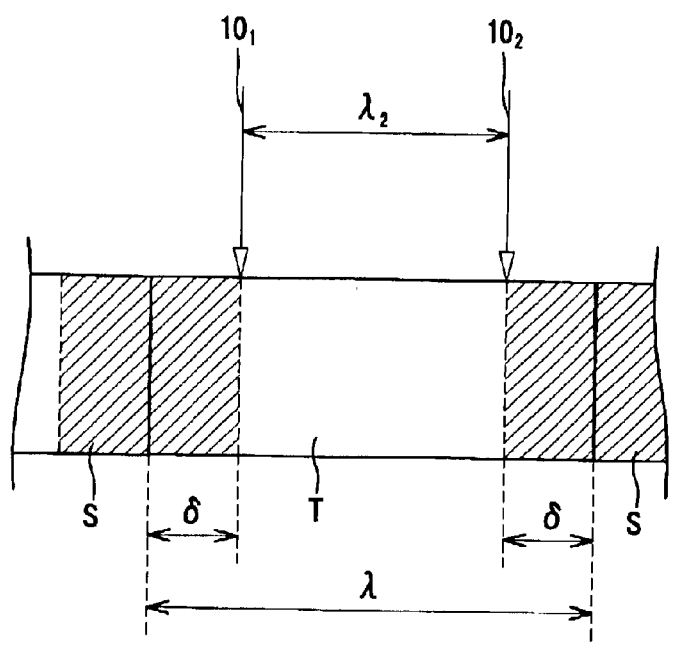
FIG. 12 shows the positional relation between two adjacent ABS detectors when the value $\lambda_2$ is larger than $2\delta$.

Further, when the value $\lambda_2$ is larger than $(\lambda-2\delta)$, two adjacent ABS detectors will be opposite to two unstable areas S occurring across one micro-area and thus no ABS detectors will be opposite to any stable area T between the two unstable areas S such that the ABS head 4 will not be able to detect n successive micro-areas. More specifically, as shown in FIG. 12, if the distance between the ABS detectors $10_1$ and $10_2$ is larger than $(\lambda-2\delta)$ when n=4 and m=1, an stable area T which cannot be detected will occur between the unstable area S to which the ABS detector $10_1$ is opposite and unstable area S to which the ABS detector $10_2$ is opposite and thus the ABS head 4 will not be able to detect any 4-bit code. It should be noted that the ABS detectors $10_3$, $10_4$ and $10_5$ are not illustrated in FIG. 12.

Note that the value $\lambda_2$ should preferably be generally fixed. When the value $\lambda_2$ is generally fixed, the ABS detectors opposite to the unstable areas S will shift one after another at a constant interval. Therefore, the ABS detectors can be selected at the constant interval based on the INC value which will be described in detail later. That is to say, when the value $\lambda_2$ is generally fixed, it is easier to select the ABS detectors, where by the circuit configuration of the select signal generation block 25 etc. can be more simplified.

Figure 8:
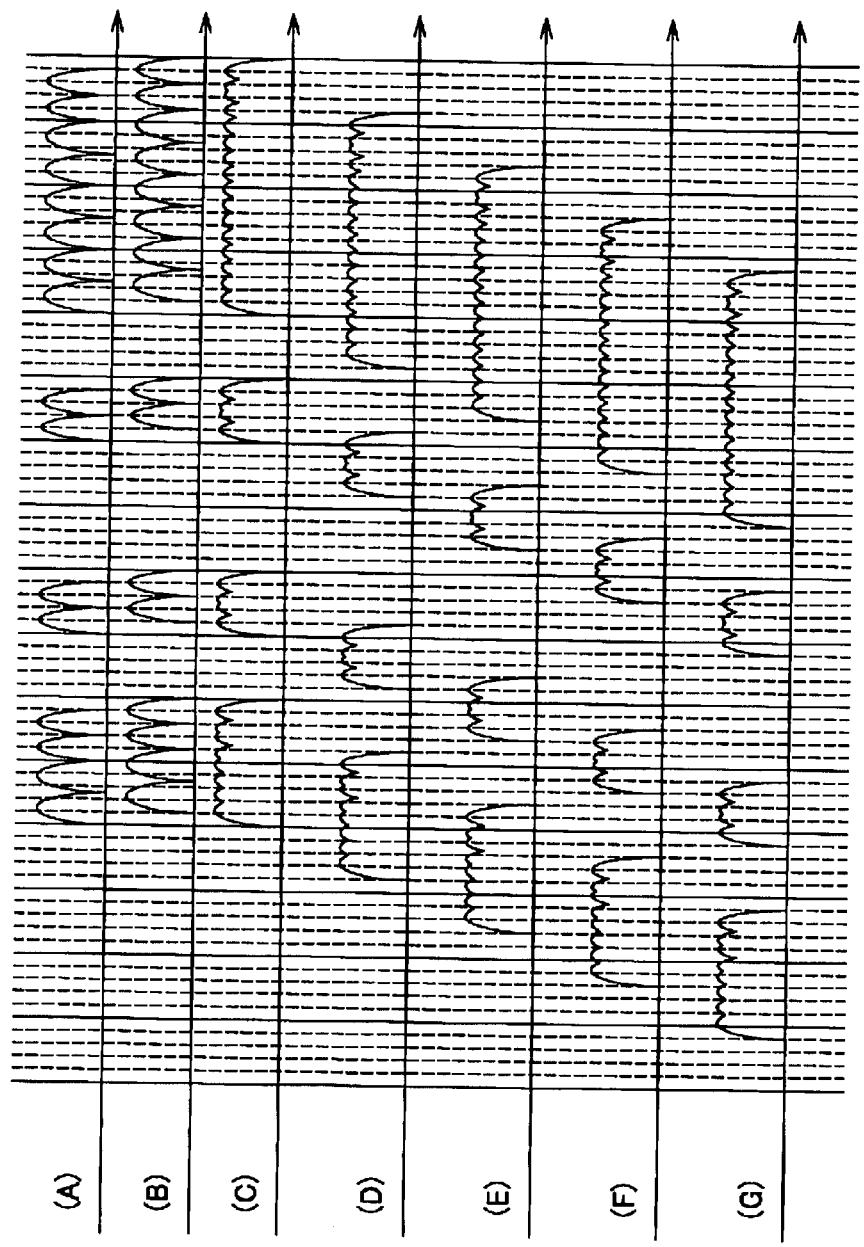
FIG. 8 shows a waveform indicating a signal output from each ABS detector.
Figure 13:
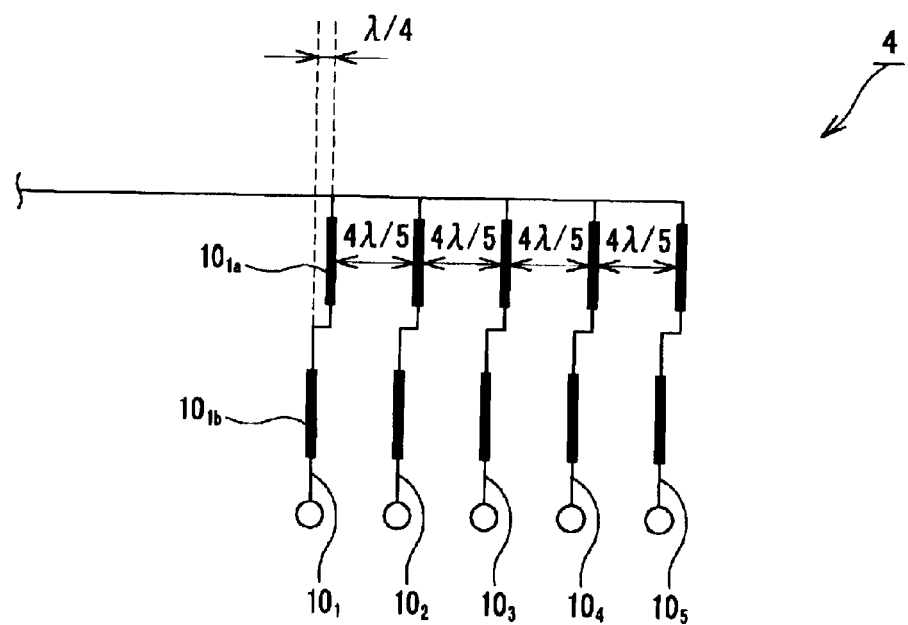
FIG. 13 schematically show the layout of the ABS detectors in the embodiment of the present invention.
Figure 14:
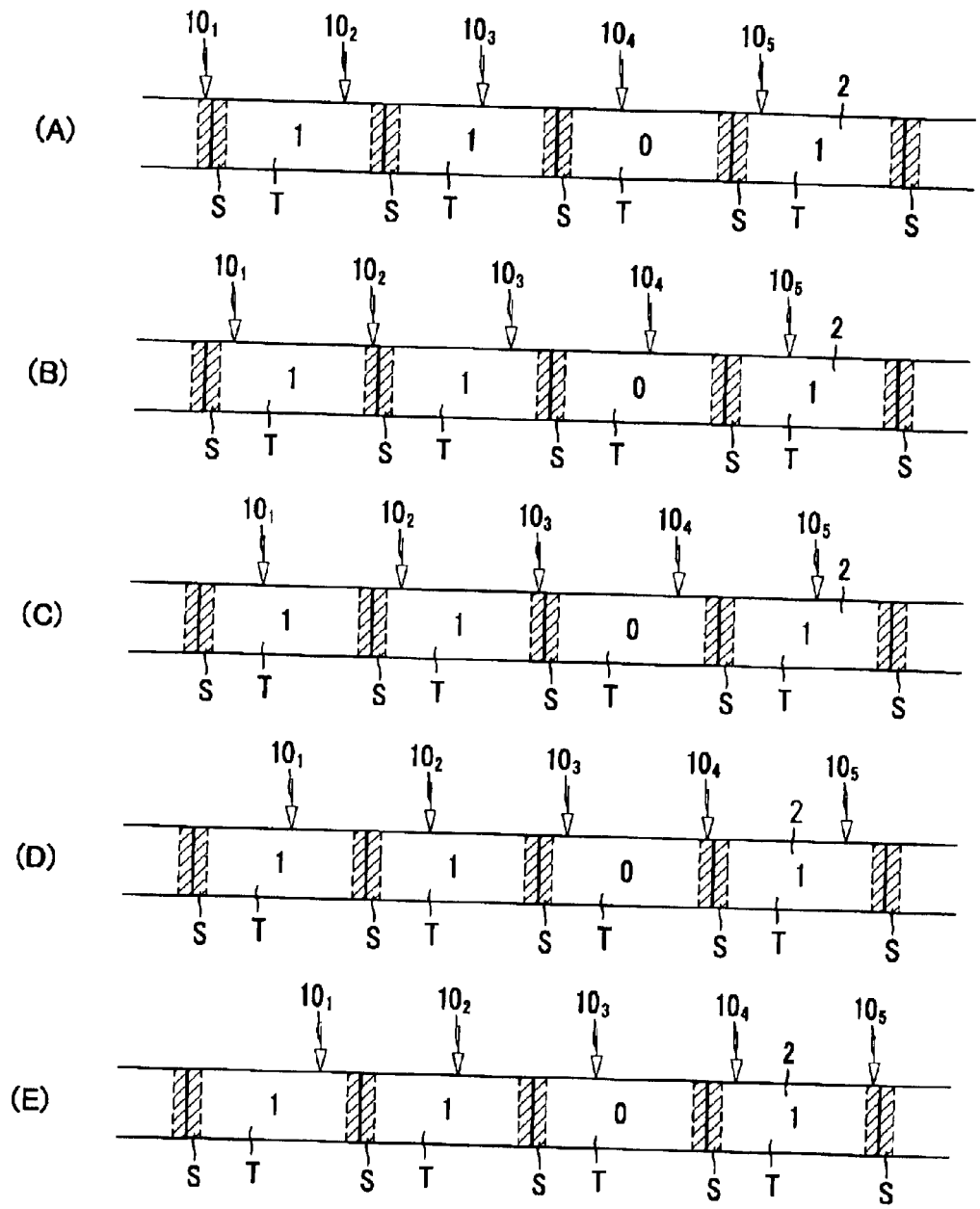
FIG. 14 schematically shows the relation between the movement of the ABS head and position of each ABS detector.

The ABS head 4 in this embodiment has five ABS detectors $10_1$ to $10_5$ laid in array at intervals of $4\lambda/5$ as shown in FIG. 13. Four of these five ABS detectors $10_1$ to $10_5$ detects a 4-bit code. The resistance of each of the ABS detectors $10_1$ to $10_5$ varies as shown in FIG. 8. Namely, the resistance of the ABS detector $10_1$ changes like the waveform shown in FIG. 8(C), that of the ABS detector $10_2$ changes like the waveform shown in FIG. 8(D), that of the ABS detector $10_3$ changes like the waveform shown in FIG. 8(E), that of the ABS detector $10_4$ changes like the waveform shown in FIG. 8(F), and that of the ABS detector $10_5$ changes like the waveform shown in FIG. 8(G).

Note that the distance $\lambda_1$ between the ABS detectors $10_1$ and $10_5$ is $3\lambda+\lambda/5$ and larger than $3\lambda+\lambda/10$. Also, the distance $\lambda_2$ between the ABS detectors $10_1$ and $10_5$ is $4\lambda/5$ and thus it is larger than $\lambda/10$ and smaller than $9\lambda/10$. That is, the ABS detectors $10_1$ and $10_5$ are disposed to satisfy the requirements given by the aforementioned expressions (1) and (2).

Movement of the ABS detectors $10_1$ to $10_5$ corresponding to the movement of the ABS head 4 and selection of the ABS detectors $10_1$ to $10_5$ corresponding to the movement of the ABS head 4 will be described herebelow. It should be noted that in the following explanation, it is assumed that the position of the ABS detector $10_1$ opposite to a micro-area is indicated with θ and when the ABS detector $10_1$ moves to a position δ short of the edge of a micro-area, namely, to a position $\lambda/20$ short of the micro-area, θ=0.

When $0<\theta\leq\lambda/5$, the ABS detector $10_1$ is opposite to an unstable area S while the ABS detectors $10_2$, $10_3$, $10_4$ and $10_5$ are opposite to stable areas T, as shown in FIG. 14(A). Therefore, when $0<\theta\leq\lambda/5$, the ABS detectors $10_2$, $10_3$, $10_4$ and $10_5$ will be selected to provide a code "1101".

Also, when $\lambda/5<\theta\leq2\lambda/5$, the ABS detector $10_2$ is opposite to an unstable area S while the ABS detectors $10_1$, $10_3$, $10_4$ and $10_5$ are opposite to stable areas T, as shown in FIG. 14(B). Therefore, when $\lambda/5<\theta\leq2\lambda/5$, the ABS detectors $10_1$, $10_3$, $10_4$ and $10_5$ will be selected to provide a code "1101".

Further, when $2\lambda/5<\theta\leq3\lambda/5$, the ABS detector $10_3$ is opposite to an unstable area S while the ABS detectors $10_1$, $10_2$, $10_4$ and $10_5$ are opposite to stable areas T as shown in FIG. 14(C). Therefore, when $2\lambda/5<\theta\leq3\lambda/5$, the ABS detectors $10_1$, $10_2$, $10_4$ and $10_5$ will be selected to provide a code "1101".

Furthermore, when $3\lambda/5<\theta\leq4\lambda/5$, the ABS detector $10_4$ is opposite to an unstable area S while the ABS detectors $10_1$, $10_2$, $10_3$ and $10_5$ are opposite to stable areas T as shown in FIG. 14(D). Therefore, when $3\lambda/5<\theta\leq4\lambda/5$, the ABS detectors $10_1$, $10_2$, $10_3$ and $10_5$ will be selected to provide a code "1101".

Moreover, when $4\lambda/5<\theta\leq\lambda(0)$, the ABS detector $10_5$ is opposite to an unstable area S while the ABS detectors $10_1$, $10_2$, $10_3$ and $10_4$ are opposite to stable areas T as shown in FIG. 14(E). Therefore, when $3\lambda/5<\theta\leq\lambda$, the ABS detectors $10_1$, $10_2$, $10_3$ and $10_4$ will be selected to provide a code "1101".

Each of the elements forming the absolute position detector 6 will be described in detail below:

The first differential output block 20 differentiates between differential output between the INC detectors $11_1$ and $11_3$ and a differential output between the INC detectors $11_2$ and $11_3$. The differential output between the INC detectors $11_1$ and $11_3$ and that between the INC detectors $11_2$ and $11_2$ are 90° out phase from each other.

Figure 15:
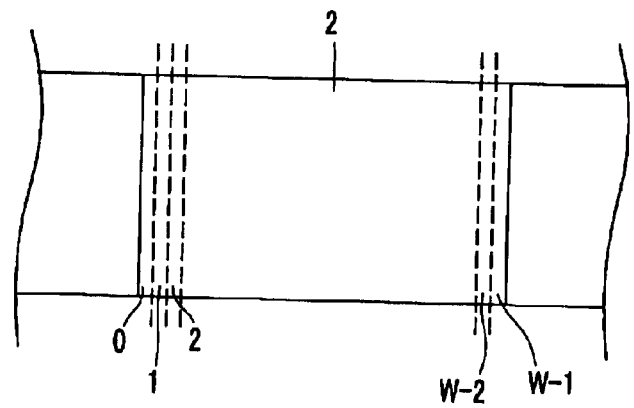
FIG. 15 schematically explains the INC value.
Figure 16:
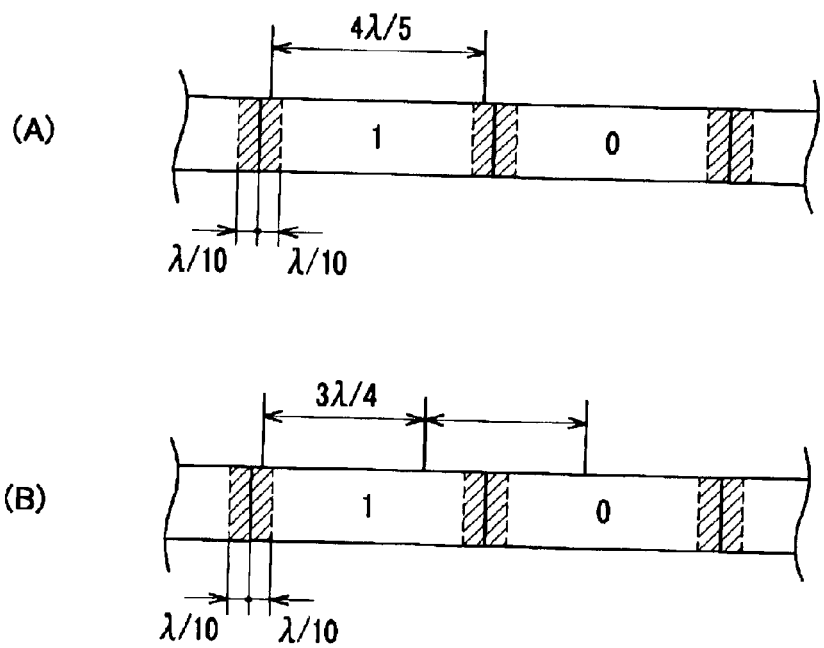
FIG. 16 schematically shows the change in proportion of an unstable area corresponding to a change in micro-area pitch.

The interpolation block 21 detects an INC value on the basis of the differential output between the INC detectors $11_1$ and $11_3$ and that between the INC detectors $11_2$ and $11_4$. The INC value indicates an absolute position of the ABS detector $10_1$ opposite to a micro-area. As shown in FIG. 15, the micro-area is equally divided by w (w is a natural number) longitudinally of the ABS track 2. The w equally divided areas of the micro-area are assigned INC values 0, 1, 2, ..., w−1, respectively to sequentially from one edge of the micro-area. It should be noted that the INC value is decided by the method disclosed in the Japanese Patent No. 2571394 etc.

The select signal generation block 22 judges to-be-selected ABS detectors based on the INC values to make select signals from the result of judgment and supply them to the signal selector 24. In this embodiment, the value θ is decided based on the INC value. When $0\leq\theta<\lambda/5$, the ABS detectors $10_2$, $10_3$, $10_4$ and $10_5$ are selected. When $\lambda/5\leq\theta<2\lambda/5$, the ABS detectors $10_1$, $10_3$, $10_4$ and $10_5$ are selected. When $2\lambda/5\leq\theta<3\lambda/5$, the ABS detectors $10_1$, $10_2$, $10_4$ and $10_5$ are selected. When $3\lambda/5\leq\theta<4\lambda/5$, the ABS detectors $10_1$, $10_2$, $10_3$ and $10_5$ are selected. When $4\lambda/5\leq\theta<\lambda(0)$, the ABS detectors $10_1$, $10_2$, $10_3$ and $10_4$ are selected.

The second differential output block 23 differentiates between the differential output between each of the ABS detectors $10_1$ to $10_5$ and the differential output detector 12, and supplies the result to the signal selector 24.

The signal selector 24 selects the signal supplied from the second differential output block 23 on the basis of the select signal. The selected signal is supplied as an n-bit code to the ROM 25. According to the present invention, the signal selector 24 supplies a 4-bit code to the ROM 25.

The ROM 25 has stored therein data indicative of the relation between the n-bit code supplied from the signal selector 24 and sectional absolute position signal indicating, by a section, a position of the ABS head 4 in relation to the ABS track 2. The ROM 25 converts the n-bit signal into a sectional absolute position signal according to the data stored therein.

The computation block 26 adds the INC value and sectional absolute position signal together. By adding them together, the computation 26 provides an absolute position signal indicating a position of the ABS head 4 in relation to the ABS track 2 with an accuracy of 1/w of the sectional absolute position signal.

The linear encoder 1 having been described above functions as will be described herebelow:

First, the first differential output block 20 detects a differential output between the INC detectors $11_1$ and $11_3$, and also a differential output between the INC detectors $11_2$ and $11_4$.

Next, the interpolation block 21 detects an INC value on the basis of the differential output between the INC detectors $11_1$ and $11_3$ and that between the INC detectors $11_2$ and $11_4$. The INC value is supplied to the select signal generation block 22 and computation block 26.

Then, the select signal generation block 22 generates, based on the INC value, a select signal indicating which of signal outputs from the ABS detectors $10_1$ to $10_5$ is to be selected. The select signal is supplied to the signal selector 24.

On the other hand, the second differential output block 23 differentiates between each of the ABS detectors $10_1$ to $10_5$ and the differential output detector 12, and supplies the result to the signal selector 24.

Then, the signal selector 24 selects, based on the select signal supplied from the select signal generation block 22, four of the five signals supplied from the second differential output block 23, and supplies the selected signals as a 4-bit code to the ROM 25.

Next, the ROM 25 converts the 4-bit code supplied from the signal selector 24 into a sectional absolute position signal.

Then, the computation block 26 adds the INC value and sectional absolute position together to provide an absolute position signal.

In the meantime, one of the methods of attaining a higher accuracy and resolution in the linear encoder is to narrow the pitch of the micro-areas. As the micro-area pitch is smaller, the value λ becomes correspondingly smaller. With the smaller value λ, however, the value δ will not vary. More particularly, with the smaller pitch, the proportion of an unstable area S in a micro-area becomes larger. When the micro-area pitch is halved, $\delta=\lambda/10$.

By positioning the ABS head 4 in relation to the ABS track of $\delta=\lambda/10$, two of the five ABS detectors $10_1$ to $10_5$ are opposite to two unstable areas S formed across one micro-area and no ABS detector will be opposite to a stable area T formed between these two unstable areas S, as will be seen from FIG. 16(A). That is, the ABS head 4 cannot detect any 4-bit code from the ABS track of $\delta=\lambda/10$.

As having been described above, positioning of the ABS detectors $10_1$ to $10_5$ to satisfy the requirements given by the aforementioned expressions (1) and (2) as well as a following expression (3) facilitates to determine the positions of the ABS detectors $10_1$ to $10_5$:

$$s\lambda-2\delta\leq\lambda_3\leq s\lambda+2\delta \qquad (3)$$

where s is a natural number and indicates a number of stable areas T formed between different unstable areas S when two of the ABS detectors $10_1$ to $10_5$ are opposite to the different unstable areas S, respectively.

Figure 17:
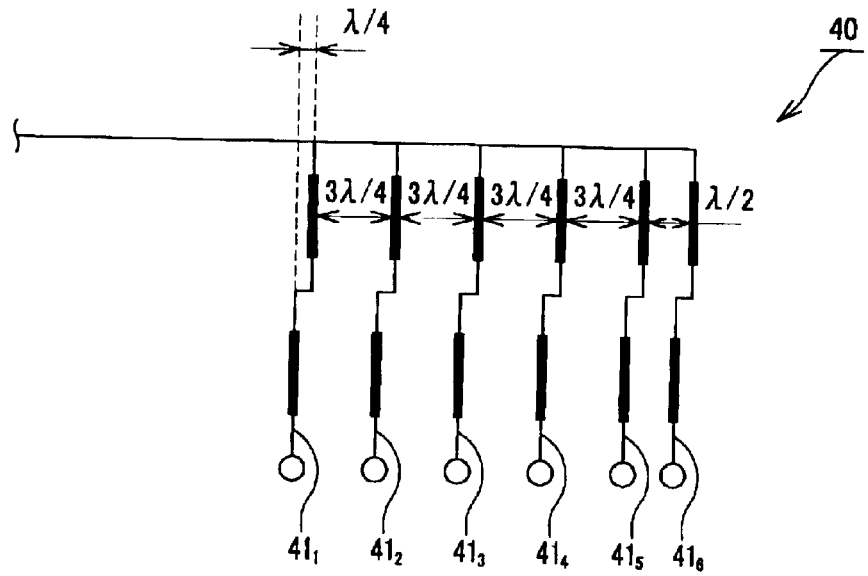
FIG. 17 is a schematic diagram of the positional relation among the ABS detectors, decided based on an expression (3)

An ABS detector capable of detecting a 4-bit code from the ABS track of $\delta=\lambda/10$ will be described herebelow:

As shown in FIG. 17, an ABS head 40 includes six ABS detectors $41_1$, $41_2$, $41_3$, $41_4$, $41_5$ and $41_6$. These ABS detectors $41_1$ to $41_6$ may be the same as the ABS detectors $10_1$ to $10_5$. The ABS head 40 can detect a magnetic field from the ABS track of $\delta=\lambda/10$, select signal outputs from four of the ABS detectors $41_1$ to $41_6$ and form the selected signals into a 4-bit code.

The ABS detectors $41_1$ to $41_6$ are disposed in a position relation as will be described below.

First, two of the ABS detectors $41_1$ to $41_6$ that are not adjacent to each other are positioned to satisfy the requirement given by the above expression (3). In the ABS head 40, the first ABS detector $41_1$ and fifth ABS detector $41_5$ are positioned at a distance of $3\lambda$ between them.

Next, s ABS detectors provided between the two ABS detectors positioned as above are positioned to satisfy the requirement given by the aforementioned expression (2). In the ABS head 40, the ABS detectors $41_2$, $41_3$ and $41_4$ are disposed at a distance of $3\lambda/4$ from their respective adjacent ABS detectors.

The ABS detectors not yet positioned are positioned to satisfy the requirements given by the expressions (1) and (2). In the ABS head 40, the ABS detector $41_5$ is position at a distance of $\lambda/2$ from the ABS detector $41_6$.

Because the ABS detectors $41_1$ to $41_6$ are positioned as above, two adjacent ABS detectors will not be opposite to two unstable areas S formed across one micro-area and at least four of the ABS detectors $41_1$ to $41_6$ will be opposite to stable areas T of four adjacent micro-areas, as shown in FIG. 16(B).

Also, in the ABS head 40, the distance between the first ABS detector $41_1$ and fifth ABS detector $11_5$ is determined to satisfy the requirement given by the expression (3) before the ABS detectors $41_1$ to $41_6$ are positioned. However, the distance between two other ABS detectors not adjacent to each other may be determined to satisfy the requirement given by the expression (3) before the ABS detectors $41_1$ to $41_6$.

Figure 18:
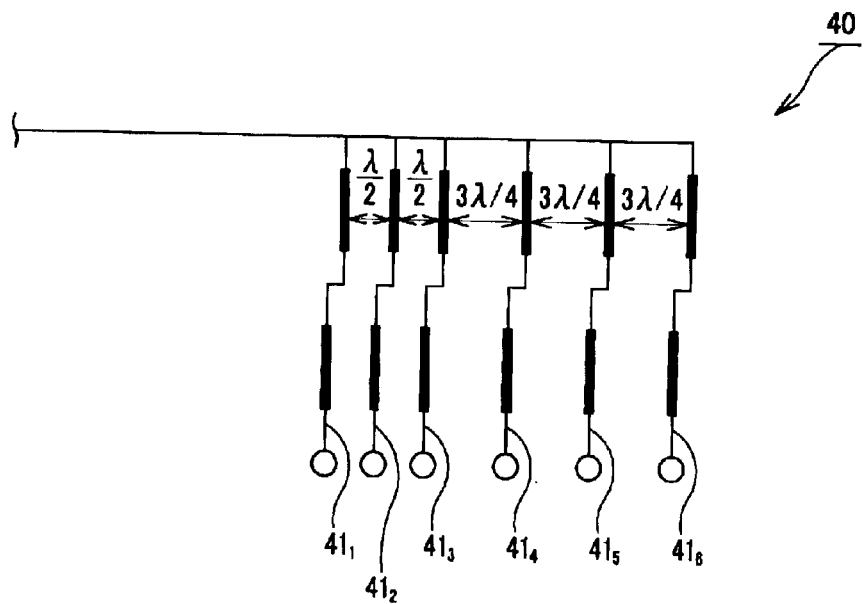
FIG. 18 is another schematic diagram of the positional relation among the ABS detectors, decided based on the expression (3).

For example, when the distance between the first ABS detector $41_1$ and third ABS detector $41_3$ is determined to satisfy the requirement given by the expression (3), the ABS detectors $41_1$ to $41_6$ in the ABS head 40 will be in a position relation as shown in FIG. 18. First, the distance between the first ABS detector $41_1$ and third ABS detector $41_3$ is set to $\lambda$. Next, the ABS detector $41_2$ is positioned at a distance of $\lambda/2$ from the adjacent ABS detector. Then, the ABS detectors $41_4$, $41_5$ and $41_6$ are positioned at a distance of $3\lambda/4$ from their respective adjacent ABS detector.

Note that the select signal for selection of n ABS detectors may not be generated based on the INC value. For example, it may be generated on the basis of an index or mark detected from a predetermined place.

Also note that in the foregoing, the present invention has been described concerning its application to the linear encoder but the present invention is applicable to any other position transducer than any linear encoder, for example, a rotary encoder.

Note that in the foregoing, the present invention has been described concerning its application to the magnetic position transducer but the present invention is applicable to any other position transducer than the magnetic type one, for example, an optical or capacitance type position transducer.

The position transducer according to the present invention can accurately detect an n-bit signal from an absolute track by an absolute track head including (n+m) absolute track detectors even when there is provided only one absolute track. Therefore, the position transducer according to the present invention can have the circuit thereof constructed more simple, compact and less expensive by setting the value m to 1 or 2.

Also, the position transducer according to the present invention can detect the position of an absolute track head in relation to an absolute track even when an absolute track detector is opposite to near the edge of a micro-area. Therefore, the position transducer according to the present invention can detect the position of the absolute track head in relation to the absolute track independently of the position of the absolute track detector. Also, the position transducer according to the present invention can detect an n-bit code over the effective length of measurement of the absolute track. Further, the position transducer according to the present invention can detect the position of the absolute track head in relation to the absolute track with a high resolution.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A position transducer comprising:

an absolute track in which micro-areas each represented by "0" and those each represented by "1", when two types of micro-areas different in signal-selective physical property from each other are represented by either of two codes "0" and "1", are laid in array to provide an n-bit code (n is a larger integer than 3);

an absolute track head having (n+m) (m is a larger integer than 1) absolute track detectors laid in array oppositely to the absolute track and which is movable in relation to the absolute track to detect the physical property of the absolute track; an intra-micro-area position detecting means for detecting the position of each absolute track detector in the micro-area;

a signal selecting means for selecting n ones of (n+m) signal outputs from the absolute track detectors on the basis of the result of detection by the intra-micro-area position detecting means; and a code deciding means for the n-bit code on the basis of signal output from an absolute track detector selected by the signal selecting means;

a distance $\lambda_1$ between the first one and (n+m)th one of the absolute track detectors satisfying a requirement that $(n-1)\lambda+2\delta<\lambda_1$ (where $\lambda>0$ and $\delta>0$, $\lambda$ is the minimum resolution length of signal output from each absolute track detector and $\delta$ in an unstable area is a length in the moving direction of the absolute track head); and a distance $\lambda_2$ between the absolute track detectors satisfying a requirement that $2\delta<\lambda_2<\lambda-2\delta$.

2. The apparatus as set forth in claim 1, wherein the distance $\lambda_2$ between two adjacent ones of the absolute track detectors is generally the same.

3. The apparatus as set forth in claim 1, wherein the absolute track detectors are disposed for the distance $\lambda_3$ between two of the absolute track detectors that are not adjacent to each other to be over $(s\lambda-2\delta)$ and under $(s\lambda+2\delta)$ (where $\underline{s}$ is a natural number indicating a number of unstable areas formed between different unstable areas when two of the absolute track detectors are opposite to the different unstable areas, respectively, and $\underline{s}$ absolute track detectors are disposed between the two absolute track detectors disposed at the distance $\lambda_3$.

4. The apparatus as set forth in claim 1, wherein the (n+m) absolute track detectors are disposed so that a maximum of $\underline{m}$ absolute track detectors is opposite to different unstable areas, respectively.

* * * * *

UNITED STATES PATENT AND TRADEMARK OFFICE
CERTIFICATE OF CORRECTION

PATENT NO. : 6,772,088 B2
DATED : August 3, 2004
INVENTOR(S) : Nekado et al.

It is certified that error appears in the above-identified patent and that said Letters Patent is hereby corrected as shown below:

Column 2,
Line 30, delete "Japanese Unexampled Application" and insert -- Japanese Unexamined Application --.
Lines 32-33, delete "Publication No. 1988-152314" and insert -- Publication No. 1989-152314 --.

Signed and Sealed this

First Day of February, 2005

JON W. DUDAS
*Director of the United States Patent and Trademark Office*